United States Patent [19]

Bom et al.

[11] Patent Number: 4,838,207
[45] Date of Patent: Jun. 13, 1989

[54] IMPLEMENT FOR AND A METHOD OF MILKING AN ANIMAL

[75] Inventors: Cornelis J. G. Bom, Rozenburg; Karel van den Berg, Bleskensgraaf, both of Netherlands

[73] Assignee: C. van der Lely N.V., Maasland, Netherlands

[21] Appl. No.: 222,611

[22] Filed: Jul. 21, 1988

[30] Foreign Application Priority Data

Jul. 23, 1987 [NL] Netherlands .......................... 8701735

[51] Int. Cl.[4] .............................................. A01J 3/00
[52] U.S. Cl. .............................. 119/14.02; 119/14.14
[58] Field of Search ............... 119/14.01, 14.02, 14.03, 119/14.04, 14.05, 14.08, 14.1, 14.11, 14.12, 14.13, 14.14, 14.18

[56] References Cited

U.S. PATENT DOCUMENTS

| | | | |
|---|---|---|---|
| 4,010,714 | 3/1977 | Notsuki et al. | 119/14.03 |
| 4,223,635 | 9/1980 | Akerman | 119/14.02 |
| 4,508,058 | 4/1982 | Jakobson et al. | 119/14.02 |
| 4,685,422 | 8/1987 | Middel et al. | 119/14.13 |
| 4,726,322 | 2/1988 | Torsius | 119/14.14 |
| 4,748,936 | 6/1988 | Hogenesch | 119/14.14 X |

FOREIGN PATENT DOCUMENTS

| | | |
|---|---|---|
| 0091892 | 10/1983 | European Pat. Off. . |
| 0098558 | 1/1984 | European Pat. Off. . |
| 0191517 | 8/1986 | European Pat. Off. . |
| 0194729 | 9/1986 | European Pat. Off. .......... 119/14.14 |
| 0209202 | 1/1987 | European Pat. Off. . |
| 0213660 | 3/1987 | European Pat. Off. . |
| 0229682 | 7/1987 | European Pat. Off. . |
| 3307384 | 9/1983 | Fed. Rep. of Germany . |
| 8503580 | 7/1987 | Netherlands ...................... 119/14.14 |
| 8502973 | 7/1985 | PCT Int'l Appl. . |
| 2007486 | 5/1979 | United Kingdom . |

Primary Examiner—Richard J. Apley
Assistant Examiner—Robert W. Bahr
Attorney, Agent, or Firm—Robert A. Miller; Penrose Lucas Albright

[57] ABSTRACT

An implement for milking an animal, such as a cow, that comprises a milking parlor where the animal can be positioned so that a robot arm which carries teat cups for application to the animal's teats can be positioned between the animal's front and rear legs. The robot arm is linked to a padded sensor that contacts the animal's hindquarters such that the robot arm maintains a relatively stable position between the animal's legs upon the animal's forward or rearward movement. The end of the robot arm can be located precisely relatively to the teats by an ultrasonic sensor. The implement provides for individual application of each teat cup to a teat and, once the teat cup is attached to the teat, the teat cup to be released from the robot arm so that a flexible connecting member provides the link between the rotor arm and the teat cup during milking. Upon completion of the milking, the flexible connecting member is used to pull the teat cup to the robot arm and seat it thereon.

30 Claims, 7 Drawing Sheets

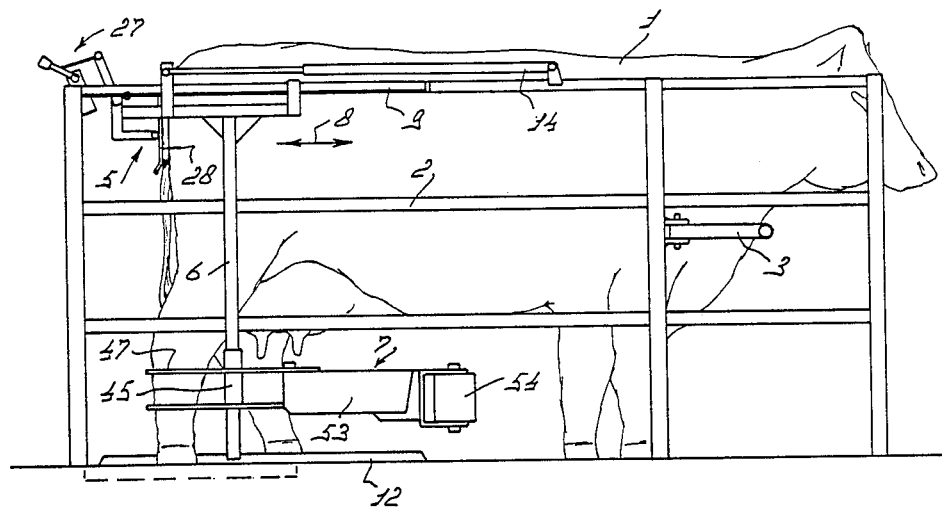
FIG. 1
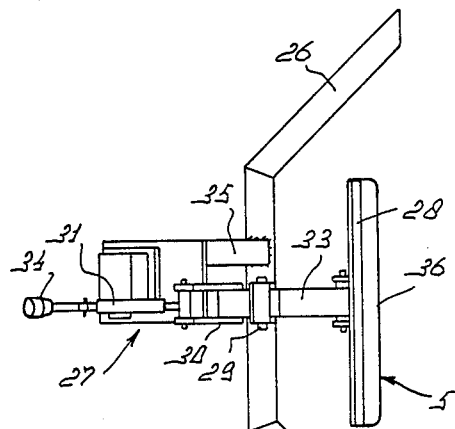
FIG. 3
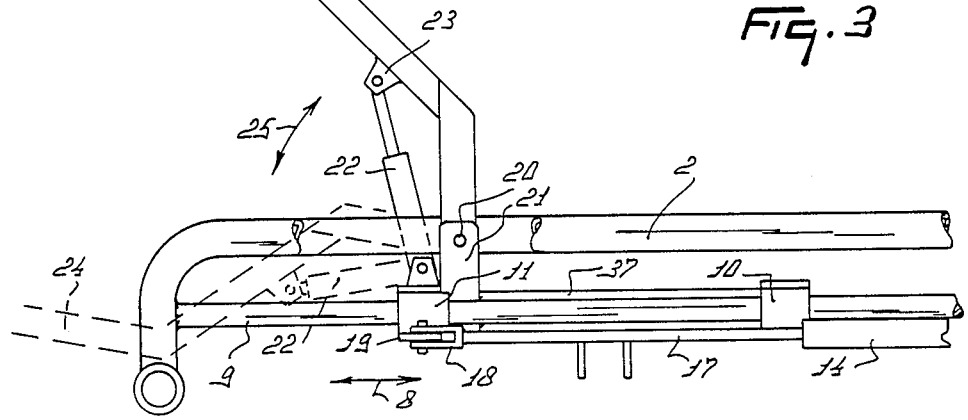

IMPLEMENT FOR AND A METHOD OF MILKING AN ANIMAL

BACKGROUND OF THE INVENTION

The invention relates to an implement for milking an animal such as a cow, wherein the implement includes a milking parlor, where the animal is present in a substantially predetermined position, and means for milking the animal. By use of the implement, it is possible for one or more teat cups to be connected to one or more teats of the animal's udder.

In automating the milking operation, so that the milking of cows is effected without the presence of operating staff or the staff having a supervisory function only, it is of prime importance that one of the most critical actions, the application of the teat cups to the teats, is done reliably and efficiently. In addition, ideally the implement should be comparatively cheap.

In practice, luring of an animal to be milked to a milking parlor, in particular by providing food as the lure has not been found to offer great problems. Once the animal is in the milking parlor, it can be positioned in a normal manner by providing a boundary at the front end of the milking parlor, the animal tending to lean against the boundary so as to reach with its head into a manger, where the food lure is located, in front of the milking parlor. By also limiting the width of the milking parlor, the position of the animal, as ready to be milked, is generally prescribed. However, the positions of the teats of the animal's udder are not precisely determined thereby, in particular because the animals differ in size and the positioning of their teats on the udder differs. In addition, the position of the teats on the same animal differs based upon other circumstances, such as the quantity of milk contained in the udder. Moreover, the animal may assume varying postures and/or be moving.

SUMMARY OF THE INVENTION

The object of the invention is to provide a comparatively cheap implement and method by which teat cups can be connected to the teats of the animal's udder in a reliable and efficient manner.

To that end, according to the invention, there is arranged a movable arm, henceforth to be called a "robot arm," that can simultaneously carry all of the teat cups to be attached to the teats and is provided with means to individually place each teat cup on a teat of the animal's udder by means of a substantially upward movement of the relevant teat cup.

In addition, according to the invention, the implement is provided with a movable arm, or robot arm, which approaches the animal's udder substantially from the front side. In practice it has been found that, generally, the positions of the teats with respect to the hind legs of the animal are such that to approach the teats, with teat cups, from the front side minimizes the problems. This is particularly true in case of animals that kick with their hind legs during milking.

In accordance with a further feature of the invention, the robot arm is provided with one or more teat cups at its end. All teat cups to be attached are arranged near the end of the robot arm, while the robot arm, or parts thereof, perform movements that permit the teat cups to be attached individually.

In addition, in accordance with the invention, the robot arm is provided with a substantially vertical first pivot pin which, during operation, can be positioned between the front and rear legs of the animal and about which the end of the robot arm is capable of pivoting in a substantially horizontal plane. In accordance with a further feature of the invention, the end of the robot arm is movable relative to the milking parlor substantially in the longitudinal direction by changing its distance from the first pivot pin, the robot arm portion located between the end of the robot arm and the first pivot pin being telescopically slidable. Thus, the end of the robot arm is capable of moving in a horizontal plane in all directions relative to a point located approximately midway below the animal, the udder being approached by the robot arm approximately straight from the front side.

In accordance with a still further feature of the invention, the robot arm is pivotal about a substantially vertical second pivot pin which is located outside the milking parlor, or near the wall thereof, and approximately aligned with the animal's udder or further to the rear, so that the robot arm may be brought to a non-operative position outside the milking parlor. Thus, the end of the robot arm can be pivoted so that the robot arm can be moved beyond the reach of the animal thereby providing sufficient room for the animal to enter or leave the milking parlor.

Further, according to the invention, the robot arm is connected to a frame which is movable, relative to the milking parlor, in the longitudinal direction. The robot arm being pivotably connected to said frame via the second pivot pin. By moving the frame forward or rearward, it is possible to pivot the robot arm from the best position under the animal to a position outside the milking parlor and vice versa.

In accordance with a further feature of the invention, there are provided spring-loaded means which fix the robot arm while allowing a spring-induced deflection thereof by rotation about a pivot pin. The spring-loaded means retain the robot arm at a fixed angle relative to the frame but, when the animal kicks or strikes the robot arm, the robot arm yields by pivoting away under the action of the spring, so that damage to the robot arm is precluded. After deflection, the robot arm is returned to the proper position and there retained by the spring-loaded means.

In accordance with a still further feature of the invention, there is provided a sensor device capable of establishing the animal's position in the milking parlor, in particular the animal's position in relation to the longitudinal axis of the milking parlor. In accordance with a feature of the invention, the sensor device includes a stop adapted to bear against the hindquarters of the animal. The stop may be upholstered so that it forms a cushion.

In accordance with a further feature of the invention, once the animal's position along the longitudinal axis of the milking parlor has been established, it is possible to adjust the movable frame in accordance with the animal's position.

In accordance with a still further feature of the invention, the sensor device for establishing the animal's position is connected mechanically to the movable frame, so that the frame, and hence the robot arm, can move forward or rearward in response to movement of the animal in either direction. In this respect, there may be provided means for determining the position of the sensor device relative to the robot arm based upon the animal involved.

In addition, in accordance with the invention, the sensor device is provided with a stop which bears against the animal, while there are arranged actuating means for moving the sensor device in dependence on the position of the stop. The use of these actuating means renders it possible to limit the pressure against the hindquarters of the cow to a minimum or to adjust same at will by means of, e.g., an adjustable spring. The actuating means ensure that the sensor device moves together with the stop, which stop, of course moves together with the animal. The actuating means may consist of a simple feed-back mechanism which keeps the stop in a fixed position relative to the sensor device, and, when its position deviates therefrom, the sensor device is moved by, e.g., a hydraulic or pneumatic cylinder in such a manner in the forward or rearward direction that the position of the stop relative to the sensor device remains constant.

In accordance with a still further feature of the invention, the robot arm is adjustable in height, the adjustability being provided by attaching the robot arm vertically movably to the movable frame.

The invention further relates to an implement for milking an animal, such as a cow, which includes a milking parlor where the animal can be confined in a substantially predetermined position and means for milking the animal. The implement permits one or more teat cups to be connected automatically to one or more teats of the animal's udder by means of a robot arm having, near the end thereof, detection means capable of establishing the position of an object, in this case a teat, in a portion of space which will hereafter be designated, a plane. The plane is substantially a flat or a conical shape. In accordance with a further feature of the invention the plane is positioned above a teat cup, the teat cup being located near the end of the robot arm and carried thereby. By adjusting the robot arm to different positions, in height, it is possible to find a position where the required or desired number of teats are located in the plane and then establish the position of the teats relative to the detection means and/or to the end of the robot arm and the teat cups connected thereto. In this connection, use is made of the fact that, for a given animal, the height of the teats above the floor surface does not vary greatly, even when the animal moves about.

In accordance with the invention, the detection means are provided with a sensor which transmits and-/or receives a directional signal. The sensor may, for example, be an ultrasonic transducer. In order to obtain a more accurately directed signal, the signal can be reflected by a concave mirror located near the sensor. By use of such a mirror it is possible to reduce the angle of divergency of the transmitted signal from approximately 10° to approximately 4°. Used in this manner, the mirror can deflect the signal through an angle of approximately 90°, so that the distance covered by the signal is increased, which may be advantageous for an ultrasonic sensor. In accordance with a further feature of the invention, the sensor and/or mirror is capable of pivoting or rotating, preferably about an upwardly directed axis which is at an angle with the horizontal plane. Alternatively, according to the invention, the rotational pivoting movement can be effected about a substantially vertical axis. It should be noted that the teats of an animal usually extend substantially vertically, so that signals transmitted in a substantially horizontal direction are reflected most advantageously.

In accordance with a still further feature of the invention, the sensor and/or the mirror can perform a reciprocating movement within a predetermined arc, the arc may subtend an angle of 180° and, preferably, be directed rearwardly. Alternatively, the area can be determined in dependence on the anticipated position of the teat, and the area can be reduced still further when the position of the relevant teat has been established more accurately.

In accordance with a still further feature of the invention, the detection means are provided on the upper side of the robot arm, and the detection means are provided, at least on the upper side, with a protective cover which may have a somewhat rounded shape. This protective cover may be of importance when the detection means are located under the udder and are moved about, since it is possible that, for example, when the rearmost teats are being detected, the foremost teats may hit the detection means. In accordance with a still further feature of the invention, the detection means are located at a distance of less than 150 millimeters from the center line of the teat cup when carried by the robot arm, the distance being, for example, 100 millimeters. It is further obvious that when milking a cow, a cow normally having four teats, the foremost teats may contact the protective cover of the detection means when a teat cup is applied on one of the rearmost teats. For that reason, in accordance with a further feature of the invention, the detection means are located, with respect to the longitudinal axis of the milking parlor, between the teat cups intended for the rearmost teats.

In accordance with a further feature of the invention, a computer may be part of the implement in order to calculate the position of a detected object (teat or teats) relative to the end of the robot arm. In accordance with a still further feature of the invention, the computer can provide guidance to the control means directing movement of the robot arm, so that one robot arm with supported teat cup can be moved under a teat of the animal's udder. The control means may be fitted with hydraulic and/or pneumatic operating cylinders which steer the robot arm directly to the desired location or impart a given movement thereto until a desired location has been reached and detected.

In accordance with a further feature of the invention, the teat cup is connected to the robot arm by a flexible connecting member which forms a flexible connection between the robot arm and the teat cup during milking and is capable of drawing the teat cup to the robot arm when necessary, for example, after milking or when attachment of the teat cup to the teat has not been successful. In accordance with the invention, the flexible connecting member may be a wire or rope made of, for example, a synthetic resin material and/or a metal. Alternatively, according to the invention, two flexible connecting members may be provided between the teat cup and the robot arm, and the flexible connecting members may be connected to the side edge of the teat cup.

In accordance with a still further feature of the invention, there may be provided guide means for the flexible connecting member. The guide means may be comprised of rollers or similar component parts having rounded edges. Alternatively, parts made of a special material or having a special surface area to reduce or prevent wear of the flexible connecting member may be used.

According to the invention, the flexible connecting members may also be connected to a teat cup holder fitted to the teat cup. The teat cup holder provides a link between the flexible connecting member and the teat cup and, together therewith, is suspended from the teat. Thus, the teat cup holder is released from the robot arm when the teat cup is attached to a teat. In accordance with a further feature of the invention, the teat cup is connected pivotably to the teat cup holder, preferably near its upper end, the pivotal axis being at an angle with the vertical. In a preferred embodiment of the invention, the pivotal axis extends through the aperture of the teat cup, that is through the entrance to the space wherein the teat is located during milking, so that during pivoting this aperture substantially remains in the same place. Such a connection between the teat cup and the teat cup holder make it possible for the teat cup to have a certain freedom of movement when the teat cup holder is connected to the robot arm, which may be of importance in adapting the position of the teat cup to that of the relevant teat.

In addition, according to the invention, there are provided drive means for pulling the connected member, so that the teat cup, which during milking is separated from the end of the robot arm, can be pulled towards the robot arm. In order to ensure that, after having been pulled against the robot arm, the teat cup is in the appropriate position, there may be provided, as was stated before, two flexible connecting members, it is also possible to provide the robot arm and/or the teat cup or the teat cup holder with meshing parts.

In accordance with a further feature of the invention, the drive means may comprise a pneumatic or hydraulic cylinder. It is alternatively possible to use stepper motors or other types of drive means. In accordance with the invention, the drive means may be located in the robot arm. According to the invention, it is also possible for the milk hoses to extend through the robot arm, at least partially. Of course, the portions of the milk hoses located near the teat cups must have a degree of freedom to extend between the teat cups and the end of the robot arm.

In addition, in accordance with the invention, the teat cups may be movable upwardly relative to the robot arm, so that the teat cup can be moved towards the teat when the robot arm has positioned the teat cup under the teat. Further, in accordance with the invention, there may be provided means for producing a vacuum in the teat cup, approximately simultaneously with the upward movement, so that the teat cup is sucked to the teat or the teat is sucked into the teat cup.

In accordance with the invention, for each teat cup, the robot arm may be provided near its end with an upwardly slidable supporting element, against which the teat cup can be pulled by means of the flexible connecting member. In this case, in accordance with the invention, the supporting element is provided with a cutout portion through which the flexible connecting member passes, the cutout portion being in substance a vertically extending slot. Alternatively, in accordance with the invention, the supporting element may have two cutout portions which are, preferably, located one above the other.

In addition, in accordance with the invention, there may be provided means for closing the milk hose and/or the pulsating hose for the period of time the teat cup is supported by the robot arm. In accordance with a feature of the invention, a portion of the hose contained in a holder is flattened by means of a lever which is operated simultaneously with the upward movement of the teat cup relative to the robot arm. Thus, it is possible to have the same control means, such as a control cylinder, provide both the upward movement of the teat cup and the closing of the milk hose and/or the pulsating hose. In accordance with the invention, a cylinder/piston unit is connected at one end to a control lever for upwardly moving the teat cup and at its other end to a control lever for flattening the hose. As a result, both actions can be performed substantially simultaneously.

In addition, in accordance with the invention, there is provided an animal recognition system as well as means for adjusting the initial height of the robot arm and/or moving the robot arm to a suitable starting position, for example along the longitudinal axis of the milking parlor, based upon the animal present and/or information about the animal. Once the animal recognition system has identified the animal present in the milking parlor, the information known about the animal can be used, such as the time elapsed since the last milking turn, information about the animal's dimensions and the rough position of the teats on the udder. On the basis thereof, the robot arm can be moved to a position such that the detection means can detect the teats with a high degree of probability. Upon detection, the robot arm can be moved from its starting position to the desired attachment position.

In accordance with the invention, there are provided means for moving the robot arm, once an animal has entered the milking parlor, to a position where the sensor can scan a plane expected to contain the ends of the (rear) teats. Because the position of the teats is not always the same, the robot arm may first be moved to a low position whereafter, in accordance with a feature of the invention, it may be moved upwardly until the sensor detects one or more teats.

In accordance with the invention, there are provided control means which, on the basis of the information produced by the sensor, move the end of the robot arm or the sensor provided thereon to approximately halfway below the udder. In accordance with a further feature of the invention, the control means are of such a design that subsequently the sensor orients itself on one of the teats and establishes its position, whereafter the relevant teat cup is moved to below that teat and is connected thereto by means of an upward movement. In this connection, in accordance with a feature of the invention, the sensor can orient itself on a substantially vertical edge of the outline of the teat, i.e. on a position where the signal transmitted and received by the sensor is not always reflected in full. An ultrasonic transducer, performing for example sixty measurements per second, can then check, after each measurement, whether the beam is not reflected or is marginally reflected. In each case, subsequent measurement can be made at a slightly different angle. In such a way, the sensor upon reception of a reflected signal adjusts to one side and upon failure to receive a signal, adjusts to the other side, until the edge of the teat's outline is passed. By orienting on the edge of the teat, a more accurate determination of the teat's location can be made than by detection of the entire teat, as the diameters of teats do not differ to an extent that a teat cup cannot be applied in a correct manner. Moreover, it is optionally possible to determine the size of the teat during a previous measurement.

In addition, in accordance with the invention, the device for applying the teat cups to the teats of an animal's udder is provided with a robot arm which can apply the teat cups sequentially, because each teat cup is capable of upward movement relative to the robot arm.

The invention also relates to a method of milking an animal, for example a cow, the udder of which is approached from its front side by a robot arm carrying at least one teat cup, the position of at least one teat of the udder relative to the end of the robot arm being established by a sensor provided on the robot arm by scanning, in a substantially horizontal direction, an area, approximating a flat or conical plane, for the presence of one or more teats. In practice, it has been found that the detection in the horizontal direction by means of a sensor, such as an ultrasonic transducer, is an effective way of establishing the position of the teats with a high degree of reliability. In accordance with the invention, the signal is transmitted and/or received by the sensor, which may be located above the teat cups carried by the robot arm.

In accordance with the invention, the animal may be guided to the milking parlor and be recognized therein by means of an animal recognition system. Upon recognition, the robot arm assumes a starting position which has been established previously for the relevant animal and/or the circumstances, such as, the amount of milk in the udder. The sensor then generally establishes the presence and/or the position of one or more teats, and, when one or more teats are not detected in the expected position, the robot arm is adjusted to a higher or to a different position until one or more teats are detected in a desired position. Optionally, after the robot arm has been moved closer to the teats, the sensor orients itself on the position of one teat and the relevant teat cup is then positioned under that teat, concurrently the sensor continues detecting the teat. After positioning, the teat cup is moved upwardly and a vacuum is produced in the teat cup, with the object of sucking the teat into the teat cup, so that the teat cup is attached to the teat.

In accordance with the invention, once the animal present in the milking parlor is identified, the robot arm is pivoted into the space under the animal, while the robot arm is simultaneously moved forward, along the longitudinal axis of the milking parlor, until a sensor (stop) comes to bear against the hindquarters of the animal. The sensor also causes the robot arm to be moved along the longitudinal axis of the milking parlor when the animal moves slightly forward or rearward with the result being the robot arm is thereby maintained in approximately the same position under the animal.

In accordance with the invention, a plurality of teat cups carried by the robot arm are sequentially applied to the teats of the animal's udder, the first teat cups being applied to the most rearward teats. When the teat cups are applied on an udder having four teats, as in the case of a cow, the sensor is located, during application of the teat cups to the rearmost teats, approximately between the foremost teats. By positioning the teat cups intended for the rearmost teats in such a manner on the robot arm relative to the sensor that the relevant teat cups are located at some centimeters on either side of a center line in the longitudinal direction of the milking parlor, the sensor being provided on the center line, the sensor remains, during application of the teat cups to the rear teats, in a position approximately in the center under the animal (in the symmetry plane), so that it does not contact the other, or foremost teats.

In addition, in accordance with the invention, the teat cups remain connected to the robot arm via a flexible connecting member. The flexible connecting member provides the means by which the teat cup is pulled towards and against a place intended for it near the end of the robot arm, for example, when milking ended or when the application of the teat cup to the teat has failed. The flexible connecting member may consist of one or more cables, ropes or wires or of the hoses used for milking.

For a better understanding of the invention and to show how the same may be carried into effect, an embodiment thereof will now be described with reference to the accompanying drawings.

BRIEF DESCRIPTION OF THE DRAWINGS

FIG. 1 is a side view of cow present in a milking parlor;

FIG. 3 is a partial plan view taken in the direction of the arrow III in FIG. 2;

DESCRIPTION OF THE PREFERRED EMBODIMENT

Figure 2:
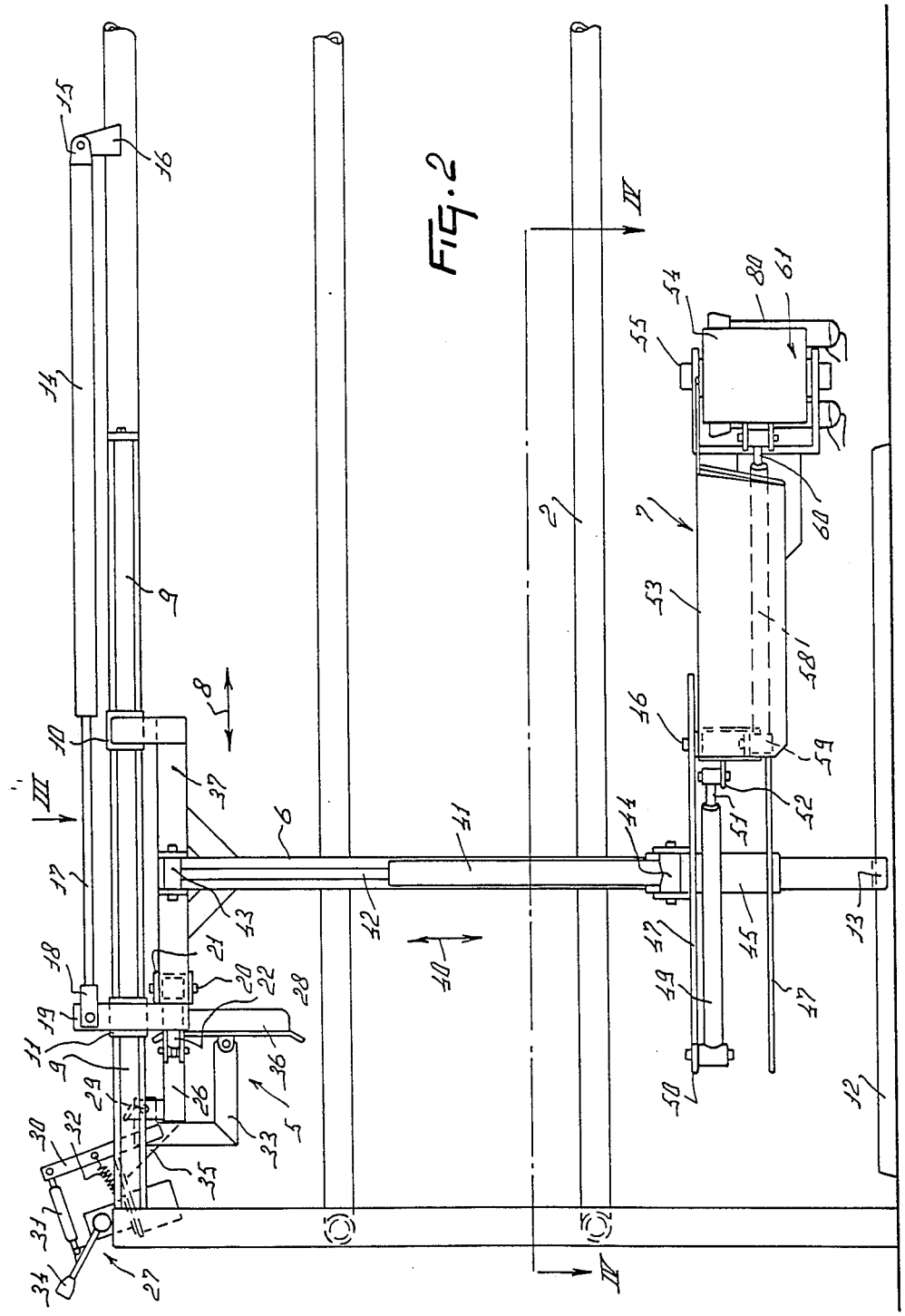
FIG. 2 is, to an enlarged scale, a detailed portion of the side view according to FIG. 1.

In the various drawings, the embodiment is shown schematically.

The side view of the implement, FIG. 1, shows a cow 1 present in the milking parlor. The milking parlor is enclosed by a railing 2 which limits the freedom of movement of animal 1 in a lateral direction. The milking parlor is entered by the animal from the rear, while a pivotal stop 3 is arranged near the front side. Stop 3 constitutes a boundary for animal 1 in the forward direction. By providing the front side of the milking parlor with a feed unit, for example, the animal will advance sufficiently far until she is against stop 3.

The milking parlor floor has a recess 4, which is constructed such that the animal will not put her hind feet therein, for example, because its bottom extends obliquely inwardly downwardly so that the hind legs of the animal, which are wide apart, will straddle recess 4. Recess 4 may have a drain for discharging the animal's excrements, if any.

Once the animal has entered the milking parlor, a sensor device 5 is pivoted against her hindquarters, as will be described in further detail with reference to FIG. 3. At the side of the milking parlor there is a substantially vertical frame beam 6. Frame beam 6, at its upper end, is provided with a longitudinal guide means and has fitted, near its lower end, a robot arm 7. Details will be set out below.

FIG. 2 shows in greater detail the features shown broadly in FIG. 1. FIG. 2 shows part of the railing 2, while also indicating how the vertical frame beam 6 is capable of moving, with respect to the milking parlor, in the longitudinal direction as denoted by arrows 8. For that purpose, railing 2 is provided with a guide rod 9 along which can move two interconnected slide blocks 10 and 11. Slide blocks 10 and 11 are interconnected by means of a horizontal frame beam 37 secured to the vertical frame beam 6. Near the floor, frame beam 6 is guided by guide rail 12, along which the lower portion 13 of frame beam 6 slides. This sliding movement, in the longitudinal direction, of frame beams 6 and 37 is effected by means of an operating cylinder 14, the end 15 of which is connected to railing 2 via a support 16 and the piston rod 17 of which is connected to a support 19 attached to frame beam 37. It will be obvious that operating cylinder 14, which can be done both pneumatically and hydraulically, produces a shift of frame beams 6 and 37 along the longitudinal axis of the milking parlor.

The frame beam 37 is further provided with a sensor device 5, which is shown in plain view in FIG. 3.

As shown in FIG. 3, the sensor device 5 is connected pivotably about a pivot pin 20 to a support 21, support 21 being attached to frame beam 37. The pivotal movement of the sensor device 5 is effected by means of an operating cylinder 22, one end of which is connected to frame beam 37 and the other end to a support 23 of sensor device 5. In the position shown in FIG. 3, sensor device 5 is in the operative position. Broken lines 24 indicate the position of sensor device 5 when the animal enters the milking parlor. The pivotal movement of sensor device 5 is indicated by arrows 25.

Sensor device 5 is fitted with a bent frame 26 which constitutes the rear fence of the milking parlor. Frame 26 comprises control means 27 to which is connected a sensor 28. Sensor 28 is adapted to bear against the hindquarters of the animal. Sensor 28, including a cushion 36, is connected pivotably about a horizontal pivot pin 29 (see FIG. 2) to frame 26 and is further provided with a lever 30 that is connected to control mechanism 27 via an adjustable intermediate shaft 31. There is also provided a spring 32 that keeps an arm 33, to which sensor 28 is connected, in the position shown.

The control mechanism 27 operates operating cylinder 14 such that the piston rod 17 is displaced therein, that is, frame beams 6 and 37, shown in FIG. 2, move to the right until sensor 28 comes to bear against the hindquarters of an animal while the arm 33, lever 30 and intermediate shaft 31 tilt in such a manner that control mechanism 27 fixes operating cylinder 14. When the animal moves somewhat to the rear, thereby causing the sensor device 5 to move to the left, as portrayed in FIG. 2, and the tilt of arm 33, lover 30 and intermediate shaft 31 to be increased still further, control mechanism 27 operates operating cylinder 14 in such a manner that piston rod 17 moves to the left, as a result of which the frame beams 6 and 37 move to the left with the animal. It will be obvious, thus, control mechanism 27 so controls operating cylinder 14 that frame beams 6 and 37 always remain approximately in the same position relative to the animal in the longitudinal direction. Control mechanism 27 includes a handle 34 by means of which, optionally, displacement of frame beams 6 and 37 can be effected by hand. Optionally, the pressure of sensor 28 against the hindquarters of the animal can be adjusted to any desired pressure. As is apparent from FIG. 3, control mechanism 27 is fitted to frame 26 by means of a support 35.

Robot arm 7, as shown in FIG. 2, is connected slidably to frame beam 6 so that it may be adjusted in height as indicated by arrows 40. The sliding movement is effected by means of an operating cylinder 41 having a piston rod 42. One end 43 of operating cylinder 41 is connected to frame beams 6 and 37 at the point where the frame beams interconnect. The other end 44 of operating cylinder 41 is connected to a slide block 45 which is capable of moving in height along frame beam 6 based upon operation of operating cylinder 41.

Figure 4:
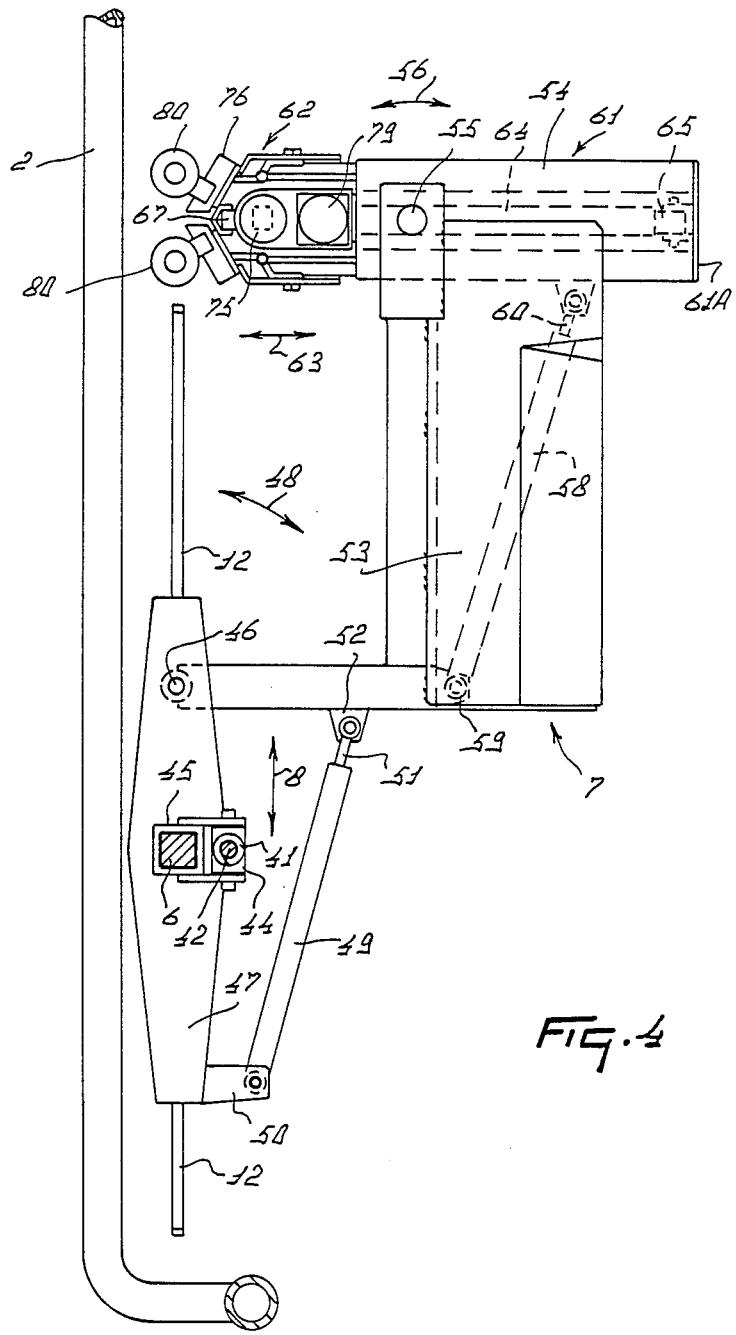
FIG. 4 is a cross-sectional view taken on the line IV—IV in FIG. 2.
Figure 5:
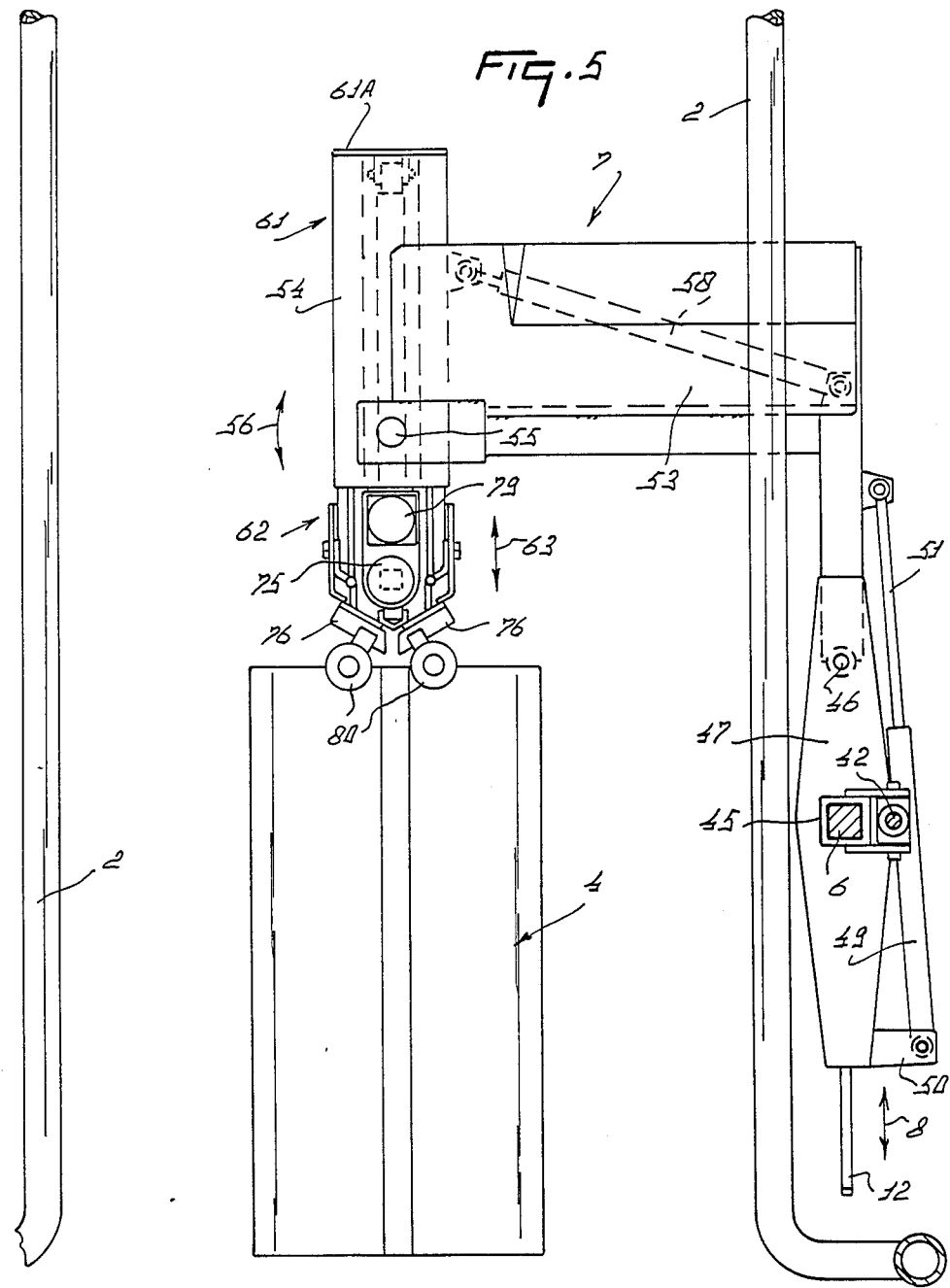
FIG. 5 is a cross-sectional view in accordance with FIG. 4, the robot arm being in the operational position.

Robot arm 7 is shown in greater detail in FIG. 4, in the rest position, and FIG. 5, the operational position. Robot arm 7 is connected, capable of pivoting about a substantially vertical pivot pin 46, to a frame 47 which is attached to side block 45. This pivotal movement, indicated by arrows 48, is effected by an operating cylinder 49 which has one end connected to a support 50 of frame 47. The piston rod 51 of cylinder 49 is connected to a support 52 which is attached to the first portion 53 of robot arm 7. By actuating operating cylinder 49, robot arm 7 can be pivoted from the rest position to the operational position and vice versa. It may be of importance for robot arm 7 to be fixed under spring load, that is in a manner that it can deflect when the animal kicks or moves against it. In this embodiment, this can be achieved by constructing the operating cylinder 49 such that it can flex, for example, by a pneumatic means.

Robot arm 7 consists of a first portion 53 and a second portion 54. Second portion 54 is connected capable of pivoting about a pivot pin 55 to first portion 53. The pivotal movement about pivot pin 55 is indicated by arrows 56 and is effected by means of a cylinder 58 whose end 59 is attached to first portion 53 of robot arm 7 and whose piston rod 60 is connected to second portion 54 of robot arm 7. As is apparent from FIGS. 4 and 5, by means of operating cylinder 49, robot arm 7 can be moved under an animal present in the milking parlor, pivot pin 55 being in a central position under the animal, that is generally between the animal's front and rear legs. Thereafter, by operation of operating cylinder 38, second portion 54 of robot arm 7 can be pivoted about pivot pin 55 to a desired angle.

Second portion 54 of 54 of robot arm 7, further details being shown in FIGS. 6, 7, 8 and 9, consists of a portion 61 which is connected pivotably to first portion 53 of robot arm 7 and a portion 62 which is axially movable relative to portion 61, as is indicated by arrows 63.

Portion 61 is of substantially hollow construction, so that, when withdrawn, portion 62 is seated partly within portion 61. Between the mutually slidable portions 61 and 62 there is arranged an operating cylinder 64, the end 65 of which is connected to portion 61 of second portion 54 of robot arm 7. The piston rod 66 of operating cylinder 64 has its end 67 connected to portion 62 of second portion 54 of robot arm 7. Portions 61 and 62 are provided with guide means 68 and 69 which slidably engage each other, guide means 68 is connected to portion 61 and guide means 69 to portion 62 (FIG. 8).

Figure 8:
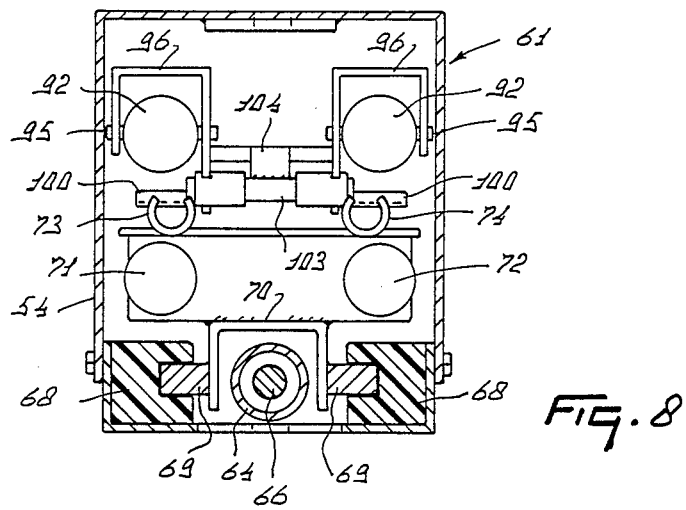
FIG. 8 is a cross-sectional view taken on line VIII—VIII in FIG. 7.

As seen in FIG. 8, a set of guide means 68 and 69 extends on either side of second portion 54 of robot arm 7, guide means 69 being interconnected by a U-shaped frame portion 70 to which are also connected two operating cylinders 71 and 72 and two milk hose holders 73 and 74. Their operation will be described in greater detail below.

Figure 7:
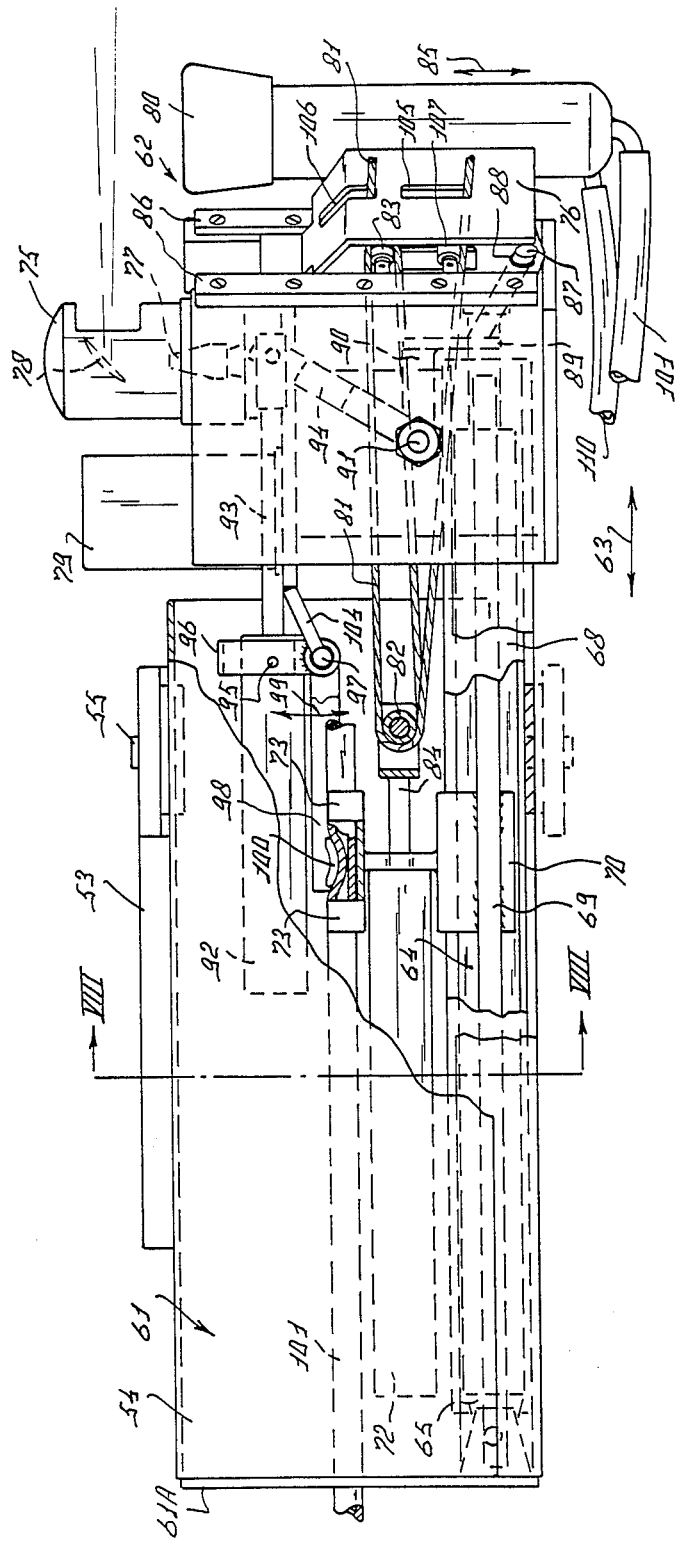
FIG. 7 is a vertical partial cross-section through part of the robot arm.

Near the ends of guide means 69, as shown in the right portion of FIG. 7, the guide means are also interconnected and support a number of component parts which slide along with guide means 69 relative to the other portions of robot arm 7. These component parts are the detection means 75, the teat cup carriers 76 and the control means therefor.

In this embodiment, detection means 75 consists of an ultrasonic sensor 77 capable of transmitting an ultrasonic signal in the upward direction. When the signal is received after reflection, the distance to the reflecting object can be calculated, while the location of the object can be determined on the basis of the data as to the direction of the transmitted signal. The ultrasonic signal is transmitted upwardly by sensor 77, where it is reflected in an approximately horizontal direction by a somewhat concave reflector 78. The use of concave reflector 78 produces a more directional signal having, for example, a divergence of approximately 4°. Reflector 78 can be turned about a substantially vertical axis by means of an operating motor 79, so that it can perform both a rotational and a reciprocating or swinging movement. By performing this movement, a disc-shaped portion of the space, which approximates a plane, can be scanned for the presence of objects. The plane may be a flat plane located perpendicular to the rotational axis of reflector 78, or it may be a conical plane having this axis as its axis of symmetry.

It is obvious that detection means 75 can establish the position of one or more teats of the animal's udder when robot arm 7 is at the appropriate level. The detected position of the teat is the position relative to the end of robot arm 7, so that there can be derived directly the movements operating cylinders 58 and 64 must perform in order to position a teat cup 80 under the relevant teat. During and directly after the end of robot arm 7 has been moved, detection means 75 can track the position of the relevant teat, so that the appropriate teat cup 80 is positioned, and remains so, under the teat to which it must be connected. The ultrasonic sensor transmits and receives a signal approximately sixty times per second, so that a constant check is possible to determine whether the teat is in the proper position relative to the robot arm 7. The use of this mode of direct control enables a very simple and hence cheap robot arm control.

A plurality of teat cups 80 can be arranged on robot arm 7, but in principle these teat cups are not connected simultaneously to the relevant teats. Once a teat cup 80 has been moved in the above-described manner to under the teat to which it is to be connected, it is moved upwardly and a vacuum is produced within the teat cup, so that the teat cup is drawn to the teat. Thereafter, teat cup 80 is released from robot arm 7, so that robot arm 7 can move to position a subsequent teat cup. The following technical means are provided for performing the actions just described.

At the end of robot arm 7 there is provided one or more teat cup carriers 76, each of which can carry a teat cup 80. Teat cup 80 is pulled against the teat cup carrier 76 by means of a flexible connecting member in the form of a cord 81. In the embodiment shown, the two ends of cord 81 are connected to teat cup 80, while, from its end, cord 81 is passed around a roller 82 and wrapped around a roller 83. Roller 83 is arranged in the slidable portion 62 of piston rod 84 of cylinder 72. It will be obvious that, when piston rod 84 is retracted in cylinder 72, the ends of cord 81 are tightened, so that teat cup 80, connected thereto, is clamped against teat cup carrier 76. However, when operating cylinder 72 is operated in such a way that piston rod 84 is extended therefrom, then teat cup 80 is no longer clamped against teat cup carrier 76 and it can move freely relative to robot arm 7 and be connected to a teat of the udder. As desired, for example, when the milking procedure has ended or for any other reason the teat cup is not connected to the teat, teat cup 80 can be pulled against teat cup carrier 76 again by the operation of operating cylinder 72. Because teat cup 80 is connected to cord 81 in two places, it will always be kept in the proper position against teat cup carrier 76.

As is shown in FIG. 7, by arrows 85, teat cup carrier 76, together with teat cup 80, is adapted to slide upwardly, teat cup carrier 76 sliding in guide means 86. The upward movement is effected by a rod 87, which extends through an aperture 88 into teat cup carrier 76 and at its other end is pivotal about a pivot pin 91 via the portions 89 and 90 (indicated in FIG. 7 by means of broken lines). By pivoting rod 87 about the pivot pin 91, teat cup carrier 76 is moved in the vertical direction in guide means 86, thereby imparting an upward movement to teat cup 80.

This upward movement is produced by means of an operating cylinder 92 containing a piston rod 93 that moves axially. A lever 94 fitted to the end of piston rod 93 pivots about pivot pin 91 together with rod 87. Operating cylinder 92 is connected pivotably about a horizontal pivot pin 95 in a tilting member 96, tilting member 96 being capable of pivoting about a pivotal axis 97 that is secured rigidly relative to slidable portion 62 of robot arm 7. A closing lever 98 which can pivot, as denoted by arrows 99, is secured rigidly to tilting member 96 and hence is pivotal about pivotal axis 97. Near its end, closing lever 98 is provided with a pressure member 100 which, as is shown in FIG. 7, can flatten a milk hose 101 so as to block same. To that end, milk hose 101 is passed through milk hose holder 73 which grips the milk hose at either side of the region where the milk hose is flattened.

As has been described above and shown in FIG. 7 operating cylinder 92 has two functions, that is, the upward movement of teat cup carrier 78 and the blocking of milk hose 101. In this regard, milk hose 101 is always in the blocked condition as long as the teat cup carrier 76 is kept in the lowermost position, the flattening of milk hose 101 is terminated as soon as the teat cup carrier 76 moves upwardly. The above-described control mechanism is provided for each teat cup carrier 76, the present embodiment having two carriers 76.

Figure 6:
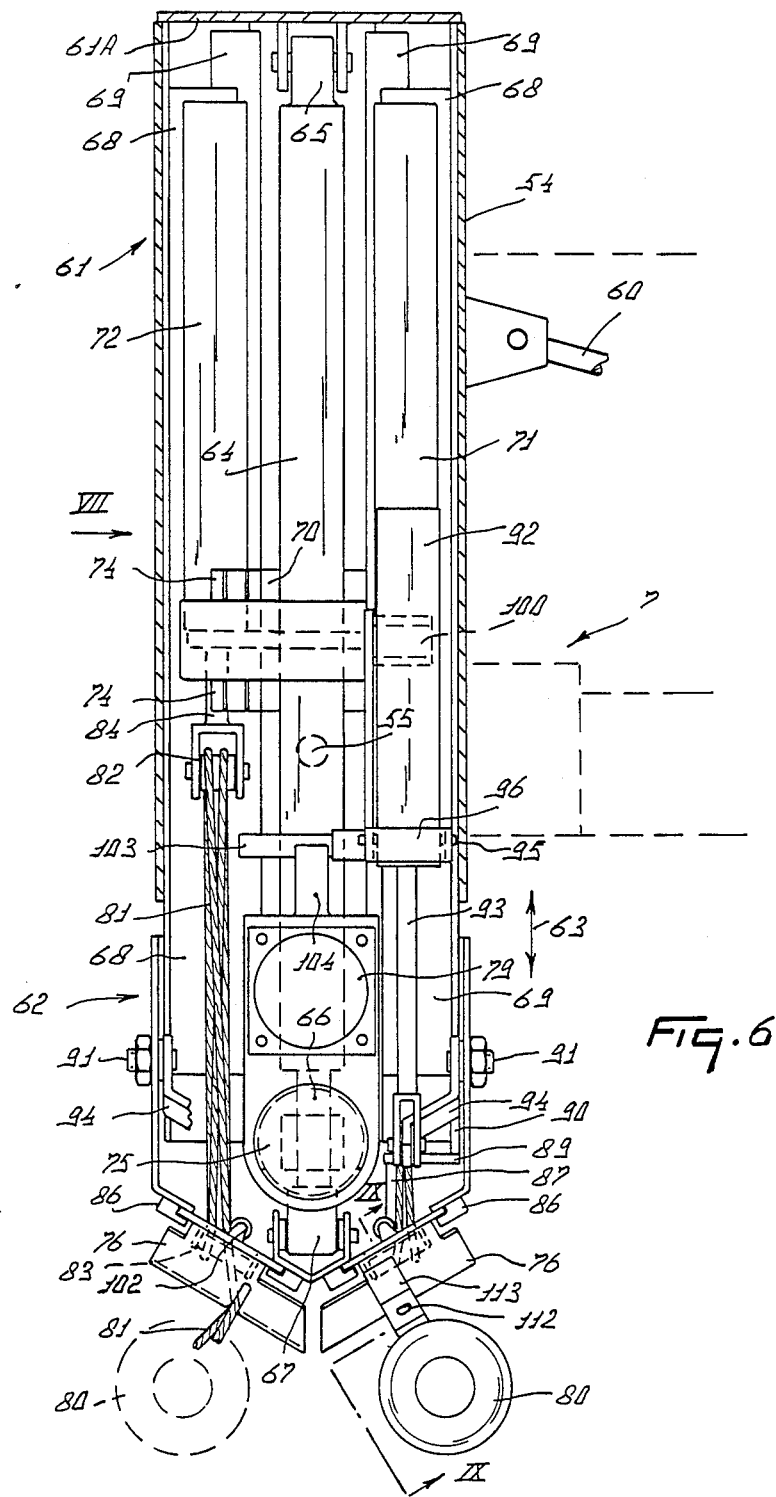
FIG. 6 is a horizontal cross-sectional view of part of the robot arm.

FIG. 6 further shows how cord 81 is guided by means of substantially vertically arranged guide rollers 102, and how a pin 103 is connected by means of plate 104 to slidable portion 62 of robot arm 7 so as to form pivotal axis 97.

FIG. 7 further shows that teat cup carrier 76 is provided with cutout portions 105 and 106 through which cord 81 is passed. Cutout portions 105 and 106 extend in the vertical direction, so that the cord 81 has some freedom of movement relative to teat cup carrier 76. Further, a roller 107 is fitted to teat cup carrier 76 below roller 83, the two rollers 82 and 107 ensuring proper guidance of cord 81.

Figure 9:
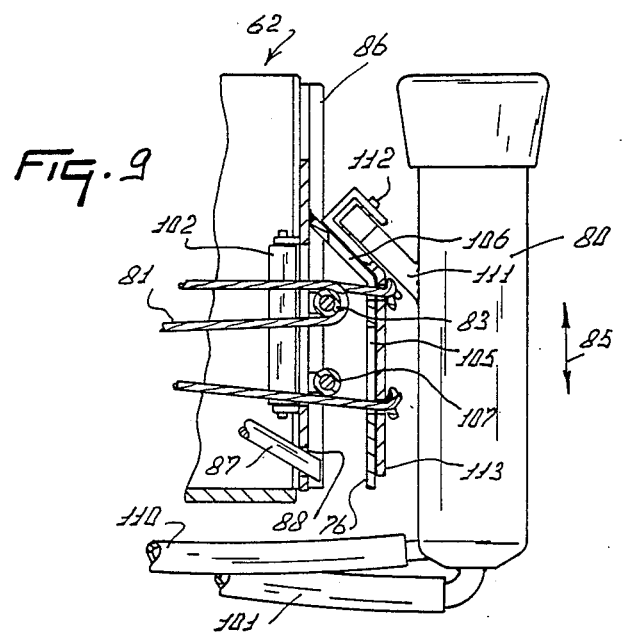
FIG. 9 is a partial cross-sectional view taken on line IX—IX in FIG. 6.

FIG. 9 shows teat cup carrier 76 and teat cup 80 in greater detail. Teat cup 80 includes milk hose 101 and a pulsating hose 110, the two of which are connected with the required clearance to robot arm 7, with the milk hose 101 being connected in the above-described manner to milk hose holder 73. Teat cup 80 is also provided with a connection arm 111 that is arranged pivotably about a pin 112 to connection member 113. Connection member 113 is connected to the ends of cord 81, so that connection member 113 is pulled up against teat cup carrier 76. It is obvious teat cup 80 has some freedom of movement about pin 112; optionally, this freedom of movement may be limited by applying spring-loaded means to keep teat cup 80 in an approximately vertical position., The extension of pin 112 passes through the center of the aperture of teat cup 80, so that, when pivoted upwardly, this aperture approximately maintains its position.

The illustrated embodiment of the implement for milking an animal operates as follows.

After an animal has entered the milking parlor and has moved forward until further movement is limited by the means appropriate thereto, such as a stop and/or a feeding arrangement, sensor device 5 is pivoted through approximately 90° by means of operating cylinder 22, until sensor 28 bears against the animal's hindquarters. Sensor 28 continues to bear thereon by means of control means 27, so that frame 6, carrying robot arm 7, always remains in approximately the same position relative to the animal.

By means of an animal recognition system (not shown in the drawings), it is established which animal is present in the milking parlor and, by means of a data processing arrangement such as a computer (not shown), further details about the relevant animal are known. For example, it is known how much time has elapsed since the animal was last milked, so that the shape of the udder, which partly depends on the quantity of milk contained therein, is roughly known. On the basis of this information, robot arm 7 can be moved, by means of the operating cylinder 41, to a desired level, which serves as the starting height for the search for the teats of the udder. Then, by means of operating cylinder 49, robot arm 7 is pivoted through approximately 90°, so that second portion 54 of robot arm 7 is located under the animal. During the pivotal movement of robot arm 7 to under the animal, frame beams 6 and 37 can be moved by operating cylinder 14 so as to prevent the animal from being struck by robot arm 7 during pivoting. On the basis of the aforementioned information, the end of robot arm 7 can also be adjusted to the desired starting position by means of operating cylinder 58 and 64 where, by means of detection means 75, a region is scanned so as to check whether one or more teats are located therein. If nothing is found, robot arm 7 is moved slightly upwardly by means of operating cylinder 41 and a further search for the presence of one or more teats is made. As soon as one or more teats has been detected in this manner, and the teat position(s) approximately corresponds to the known data for the relevant animal, the detection means concentrates on one teat only in order to move the relevant teat cup to under the teat and then to move it upward, as has been previously described. These actions are repeated until all the teat cups have been applied.

In the embodiment shown, robot arm 7 supports two teat cups 80. However, it is alternatively possible, with the object of applying, for example, four teat cups to a cow, to provide the end of robot arm 7 with four teat cup carriers which are otherwise operable in the previously described manner. It is also possible to provide not all the teats of the udder with a teat cup by means of the described robot arm, the remaining teat cups being applied from a different direction, that is from the rear side.

Further, the required additional sensors can be present for detecting and checking the various actions, such as detecting whether a teat cup has been applied in the correct manner or has not been applied, so that the relevant teat cup can be returned by means of cord 81 to the starting position for another attempt at application.

Having disclosed our invention, what we claim as new and to be secured by Letters Patent of the United States is:

1. An implement for milking an animal, such as a cow, comprising:
   a milking parlor for retaining the animal in a substantially fixed position, said fixed position generally aligned with said milking parlor's longitudinal axis;
   a frame, said frame being attached to a side wall of said milking parlor such that said frame is capable to slidable movement along said side wall parallel to said longitudinal axis;
   a robot arm, said robot arm being pivotally attached to said frame by a substantially vertical first pivot pin, said first pivot pin being located outside said side wall of said milking parlor and behind a vertical plane transverse to said longitudinal axis and tangential to the front side of the animal's udder, said robot arm further comprising two portions, a first portion attached via said first pivot pin to said frame and a second portion pivotally attached to said first portion by a substantially vertical second pivot pin, wherein said robot arm is capable of pivoting in a substantially horizontal plane around said first pivot pin such that said second pivot pin may be positioned between the animal's front and rear legs and at least one teat cup carried near an end of said second portion may approach the front side of the animal's udder; and
   means for applying each said teat cup to a teat by independent substantially upward movement of each said teat cup.

2. An implement as claimed in claim 1, further comprising a sensor device capable of establishing the animal's position in the milking parlor.

3. An implement as claimed in claim 2, wherein said sensor device establishes the animal's position relative to the longitudinal axis of the milking parlor.

4. An implement as claimed in claim 3 wherein said sensor device is connected mechanically to said frame, said frame being movable in dependence on the animal's position along the longitudinal axis of said milking parlor.

5. An implement as claimed in claim 3, further comprising means for determining the position of said sensor device relative to said robot arm in accordance with a particular animal.

6. An implement as claimed in claim 5, wherein said sensor device is provided with a stop bearing against the animal's hindquarters and further comprising actuating means for moving said sensor device in dependence on the position of said stop.

7. An implement as claimed in claim 1, wherein said robot arm is connected to said frame by said first pivot pin mounted in a slidable framework, said slidable framework adjustable in height on said frame.

8. An implement as claimed in claim 7, further comprising detection means capable of establishing the position of a teat in a plane of a substantially flat or conical shape, said detection means being mounted on the upper side of said end of said second portion of said robot arm.

9. An implement as claimed in claim 8, wherein said detection means further comprise a sensor, such as an ultrasonic transducer, which transmits and/or receives a directional signal.

10. An implement as claimed in claim 9, wherein said signal is reflected by a concave mirror mounted near said sensor, said signal being deflected through an angle of approximately 90° in a substantially rearward direction to produce a more accurately directed signal bundle.

11. An implement as claimed in claim 10, wherein said sensor and/or said mirror can pivot or rotate about a substantially vertical axis.

12. An implement as claimed in claim 11, wherein said sensor and/or said mirror performs a reciprocating movement within a predetermined area.

13. An implement as claimed in claim 7, wherein said plane is substantially horizontal and is positioned above one said teat cup which is arranged near said end of said robot arm and is supported thereby.

14. An implement as claimed in claim 13, further comprising a computer for calculating the position of a detected object relative to said end of said robot arm and for producing signals which direct control means to move said robot arm such that one said teat cup carried by said robot arm can be moved under a teat of the animal's udder.

15. An implement as claimed in claim 14, wherein said control means are provided with hydraulic and/or pneumatic operating cylinders and/or a spindle readjusting means.

16. An implement as claimed in claim 13, wherein each said teat cup is connected to said robot arm via at least one flexible connecting member, said flexible connecting member forming a flexible connection between said robot arm and one said teat cup during milking and being capable of pulling said one teat cup to said robot arm.

17. An implement as claimed in claim 16, wherein said flexible connecting member comprises a wire or a rope made of a synthetic resin material and/or a metal, said robot arm being provided with guide means consisting of rollers or similar component parts having rounded corners for defining the path of said flexible connecting members.

18. An implement as claimed in claim 16, wherein said flexible connecting member is connected to a teat cup holder, one said teat cup being pivotally connected, preferably near its upper end, to said teat cup holder such that the pivotal axis is at an angle to the vertical such that said axis passes through an open upper end of said teat cup.

19. An implement as claimed in claim 16, further comprising drive means for pulling said flexible connecting member so that said teat cup, which during milking is remote from said end of said robot arm, is returned and seated against said robot arm.

20. An implement as claimed in claim 19, wherein said drive means further comprises a pneumatic or a hydraulic cylinder accommodated in said robot arm.

21. An implement as claimed in claim 1, wherein when said teat cup is moved upwardly relative to said robot arm, there being provided means for producing a vacuum in said teat cup approximately simultaneously with the upward movement.

22. An implement as claimed in claim 21, further comprises: for each said teat cup, said robot arm being provided near its end with an upwardly slidable supporting element against which said teat cup can be pulled by means of said flexible connecting member.

23. An implement as claimed in claim 22, wherein said supporting element is provided with at least one cutout portion through which said flexible connecting member passes, said cutout portion being a vertically extending slot.

24. An implement as claimed in claim 23, further comprising means for closing a milk hose and/or a pulsating hose when said teat cup is supported by said robot arm.

25. An implement as claimed in claim 24, wherein a portion of said milk hose retained in a holder is flattened by means of a lever which is operated simultaneously with the upward movement of said teat cup relative to said robot arm.

26. An implement as claimed in claim 25, wherein a cylinder/piston unit is connected by means of its one end to a control lever for upwardly moving said teat cup and by means of its other end to a control lever for flattening said milk hose.

27. A method of milking an animal, such as a cow, comprising the steps of:
  guiding the animal to a milking parlor;
  recognizing the animal in said milking parlor by means of an animal recognition system;
  moving a robot milking arm to an initial position beneath the animal's underside and between its front and rear legs, said robot milking arm approached the animal's udder from the front side;
  attempting to detect, by means of a sensor, the presence and position of one or more teats of the animal's udder;
  adjusting the height of said robot arm when the teats are not detected and repeating the attempted detection step until detection occurs;
  orienting said sensor on one teat;
  moving one said teat cup under the teat oriented on by said sensor;
  sliding said teat cup upwardly while inducing a vacuum therein;
  attaching said teat cup to teat; and
  withdrawing said robot arm from said teat cup.

28. A method as claimed in claim 27, wherein once it has been established which animal is present in the milking parlor and said robot arm is moved into position under the animal, said robot arm is simultaneously moved forwardly along said milking parlor's longitudinal axis until a sensor device comes to bear against the hindquarters of the animal, said sensor device maintaining said robot arm in approximately the same position under said animal thereafter throughout the milking operation.

29. A method as claimed in claim 27, wherein a plurality of said teat cups carried by said robot arm are sequentially applied to the animal's udder by successively repeating the attempting, adjusting, orienting, sliding, attaching, and withdrawing steps commencing with the teats that are in a more rearward position of the udder.

30. A method as claimed in claim 29, wherein each said teat cup remains connected to said robot arm via a flexible connecting member, said flexible connecting member being the means of which each said teat cup is retrieved by being pulled towards and against a position intended therefor near the end of said robot arm at the conclusion of the milking operation for each said teat cup or when the attaching step has failed for one said teat cup.

* * * * *